(12) United States Patent
Li et al.

(10) Patent No.: US 12,365,316 B2
(45) Date of Patent: Jul. 22, 2025

(54) AUTOMATIC DRIVING CONTROL METHOD AND APPARATUS, AND ELECTRONIC DEVICE AND MEDIUM

(71) Applicant: Beijing Jingdong Qianshi Technology Co., Ltd., Beijing (CN)

(72) Inventors: Chunxiao Li, Beijing (CN); Jianwei Wang, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 50 days.

(21) Appl. No.: 18/023,659

(22) PCT Filed: Dec. 22, 2021

(86) PCT No.: PCT/CN2021/140435
§ 371 (c)(1),
(2) Date: Feb. 27, 2023

(87) PCT Pub. No.: WO2022/151936
PCT Pub. Date: Jul. 21, 2022

(65) Prior Publication Data
US 2024/0025382 A1     Jan. 25, 2024

(30) Foreign Application Priority Data
Jan. 18, 2021    (CN) .......................... 202110062047.0

(51) Int. Cl.
*B60T 8/172*      (2006.01)
*B60T 8/17*       (2006.01)
(Continued)

(52) U.S. Cl.
CPC ............... *B60T 8/172* (2013.01); *B60T 8/17* (2013.01); *B60W 30/18109* (2013.01);
(Continued)

(58) Field of Classification Search
None
See application file for complete search history.

(56) References Cited

U.S. PATENT DOCUMENTS 8,924,048 B2 * 12/2014 Smith ..................... B61L 3/127
                                                                                                         701/19
9,446,746 B2 * 9/2016 Harrison ............... B60T 8/1708
(Continued)

FOREIGN PATENT DOCUMENTS

CN         105459987 A     4/2016
CN         106080556 A    11/2016
(Continued)

OTHER PUBLICATIONS

Search Report from related European Patent Application No. 21919123.6 issued Jul. 23, 2024.
(Continued)

*Primary Examiner* — Kevin R Steckbauer
(74) *Attorney, Agent, or Firm* — K&L Gates LLP

(57) ABSTRACT

Provided are an automatic driving control method and apparatus, an electronic device, and a medium. The method includes: when a current braking trigger event is acquired, determining whether a target controlled vehicle is currently located in a braking monitoring period; and when the target controlled vehicle is currently located in any braking monitoring period, sending a braking control instruction corresponding to a next braking monitoring period to the target controlled vehicle according to ranking of the braking monitoring period in which the target controlled vehicle is currently located, and entering the next braking monitoring period, where vehicle control duration of the braking control instruction corresponding to the next braking monitoring period is longer.

14 Claims, 3 Drawing Sheets

(51) Int. Cl.
*B60W 30/18* (2012.01)
*B60W 60/00* (2020.01)

(52) U.S. Cl.
CPC .... *B60W 60/0013* (2020.02); *B60W 60/0015* (2020.02); *B60W 2300/121* (2013.01)

(56) References Cited

U.S. PATENT DOCUMENTS

| | | | |
|---|---|---|---|
| 10,118,598 B2* | 11/2018 | Akahane | B60T 7/22 |
| 10,549,732 B2* | 2/2020 | Kasper | B60T 8/17616 |
| 11,027,734 B2* | 6/2021 | Ke | B60W 50/045 |
| 11,370,400 B2* | 6/2022 | Jahnke | B60R 16/023 |
| 11,427,167 B2* | 8/2022 | Breuer | B60T 8/172 |
| 11,945,425 B2* | 4/2024 | Matthaei | B60W 10/184 |
| 11,945,470 B2* | 4/2024 | Oltmann | B60W 10/184 |
| 2009/0125237 A1 | 5/2009 | Kitagawa et al. | |
| 2012/0197476 A1* | 8/2012 | Smith | B60T 8/885 701/24 |
| 2014/0358395 A1* | 12/2014 | Harrison | B60T 8/17554 701/78 |
| 2016/0325720 A1* | 11/2016 | Akahane | B60T 7/22 |
| 2018/0362002 A1 | 12/2018 | Henel et al. | |
| 2019/0084533 A1* | 3/2019 | Kasper | B60T 13/683 |
| 2019/0118783 A1* | 4/2019 | Breuer | B60T 8/172 |
| 2020/0198635 A1* | 6/2020 | Ke | B60W 40/04 |
| 2020/0406869 A1 | 12/2020 | Hwang | |
| 2021/0197864 A1* | 7/2021 | Oltmann | B60W 60/007 |
| 2021/0323590 A1* | 10/2021 | Haas | B60T 13/665 |
| 2022/0063625 A1* | 3/2022 | Ozaki | B60W 30/18018 |
| 2022/0410923 A1* | 12/2022 | Matthaei | B60W 30/165 |
| 2023/0068079 A1* | 3/2023 | Matthaei | B60W 30/09 |
| 2023/0176568 A1* | 6/2023 | von der Ohe | G05D 1/0022 701/2 |
| 2024/0025382 A1* | 1/2024 | Li | B60W 60/0015 |
| 2024/0034308 A1* | 2/2024 | Agrawal | B60W 50/14 |

FOREIGN PATENT DOCUMENTS

| | | | | |
|---|---|---|---|---|
| CN | 109298713 A | | 1/2019 | |
| CN | 111348017 A | | 6/2020 | |
| CN | 111669306 A | | 9/2020 | |
| CN | 113752997 A | * 12/2021 | | B60W 60/0025 |
| CN | 113752997 B | * 7/2022 | | B60W 60/0025 |
| EP | 4194285 A1 | * 6/2023 | | B60T 8/17 |
| JP | 2015145154 A | | 8/2015 | |
| JP | 2015182753 A | | 10/2015 | |
| WO | WO 2019/110735 A1 | | 6/2019 | |
| WO | WO-2022151936 A1 | * 7/2022 | | B60T 8/17 |

OTHER PUBLICATIONS

PCT International Search Report dated Mar. 24, 2022, for International Patent Application No. PCT/CN2021/140435.

* cited by examiner

AUTOMATIC DRIVING CONTROL METHOD AND APPARATUS, AND ELECTRONIC DEVICE AND MEDIUM

CROSS-REFERENCE TO RELATED APPLICATIONS

This patent application is a 35 U.S.C. § 371 National Stage filing based on International Application No. PCT/CN2021/140435, filed on Dec. 22, 2021, which application claims priority benefit to Chinese Patent Application No. 202110062047.0, filed on Jan. 18, 2021, the disclosures of which are incorporated herein by reference in their entireties.

TECHNICAL FIELD

Embodiments of the present application relate to the field of automatic driving technology, for example, an automatic driving control method, an electronic device, and a non-transitory computer-readable storage medium.

BACKGROUND

To increase the efficiency of logistics distribution and to save labor costs, self-driving logistics vehicles have been placed in service. The self-driving logistics vehicles include self-driving vehicles for picking and transporting goods during intelligent warehousing and self-driving logistics vehicles during package transportation and distribution. The self-driving vehicles do not have on-site security personnel to follow at any time. A self-driving vehicle performs calculation according to the data collected by a positioning apparatus and various obstacle sensing apparatuses configured in the self-driving vehicle and generates a control instruction according to the calculation result, thereby implementing the control of self-driving. When encountering an obstacle or a system calculation error during driving, the self-driving vehicle will actuate the brake to slow down or stopping operation to ensure the safety of driving.

There are at least the following technical issues in the related art: Although braking can ensure certain safety, the action of braking may cause issues, especially when frequent braking is needed. When the braking time is too short, the speed of the vehicle may not be drop to zero in time, resulting in frequent cadence braking. Thus, not only the wheels are worn greatly, but also the frequent control of the vehicle may affect the planning and control module, resulting in the unstable driving route of the vehicle. When the braking time is too long, the vehicle goes and stops, and the parking time is long, which is easy to cause traffic congestion.

SUMMARY

Embodiments of the present application provide an automatic driving control method, an electronic device, and a non-transitory computer-readable storage medium to implement the combination of a cadence braking mode and a stopping braking mode to control braking wait duration and avoid frequent braking in a certain period.

An embodiment of the present application provides an automatic driving control method. The method includes that: in response to acquiring a current braking trigger event, whether a target controlled vehicle is currently located in a braking monitoring period is determined, where when a first braking trigger event is monitored after the target controlled vehicle is started and a first braking control instruction is sent to the target controlled vehicle, a first braking monitoring period is entered; and in response to that the target controlled vehicle is currently located in a braking monitoring period, a braking control instruction corresponding to a next braking monitoring period is sent to the target controlled vehicle according to the ranking of the braking monitoring period in which the target controlled vehicle is currently located, and the next braking monitoring period is entered, where duration of the next braking monitoring period is greater than duration of the braking monitoring period in which the target controlled vehicle is currently located, and vehicle control duration of the braking control instruction corresponding to the next braking monitoring period is greater than vehicle control duration of a braking control instruction corresponding to the braking monitoring period in which the target controlled vehicle is currently located.

An embodiment of the present application further provides an electronic device. The electronic device includes at least one processor and a memory.

The memory is configured to store at least one program.

The at least one program, when executed by the at least one processor, causes the at least one processor to implement an automatic driving control method which includes: in response to acquiring a current braking trigger event, determining whether a target controlled vehicle is currently located in a braking monitoring period, where when a first braking trigger event is monitored after the target controlled vehicle is started and a first braking control instruction is sent to the target controlled vehicle, a first braking monitoring period is entered; and in response to that the target controlled vehicle is currently located in a braking monitoring period, sending a braking control instruction corresponding to a next braking monitoring period to the target controlled vehicle according to ranking of the braking monitoring period in which the target controlled vehicle is currently located, and entering the next braking monitoring period; where duration of the next braking monitoring period is greater than duration of the braking monitoring period in which the target controlled vehicle is currently located, and vehicle control duration of the braking control instruction corresponding to the next braking monitoring period is greater than vehicle control duration of a braking control instruction corresponding to the braking monitoring period in which the target controlled vehicle is currently located.

An embodiment of the present application further provides a computer-readable storage medium storing a computer program which, when executed by a processor, implements an automatic driving control method which includes: in response to acquiring a current braking trigger event, determining whether a target controlled vehicle is currently located in a braking monitoring period, where when a first braking trigger event is monitored after the target controlled vehicle is started and a first braking control instruction is sent to the target controlled vehicle, a first braking monitoring period is entered; and in response to that the target controlled vehicle is currently located in a braking monitoring period, sending a braking control instruction corresponding to a next braking monitoring period to the target controlled vehicle according to ranking of the braking monitoring period in which the target controlled vehicle is currently located, and entering the next braking monitoring period; where duration of the next braking monitoring period is greater than duration of the braking monitoring period in which the target controlled vehicle is currently located, and vehicle control duration of the braking control instruction corresponding to the next braking monitoring period is greater than vehicle control duration of a braking control instruction corresponding to the braking monitoring period in which the target controlled vehicle is currently located.

DETAILED DESCRIPTION

Hereinafter the present invention is described in detail in conjunction with the drawings and embodiments.

Embodiment One

Figure 1:
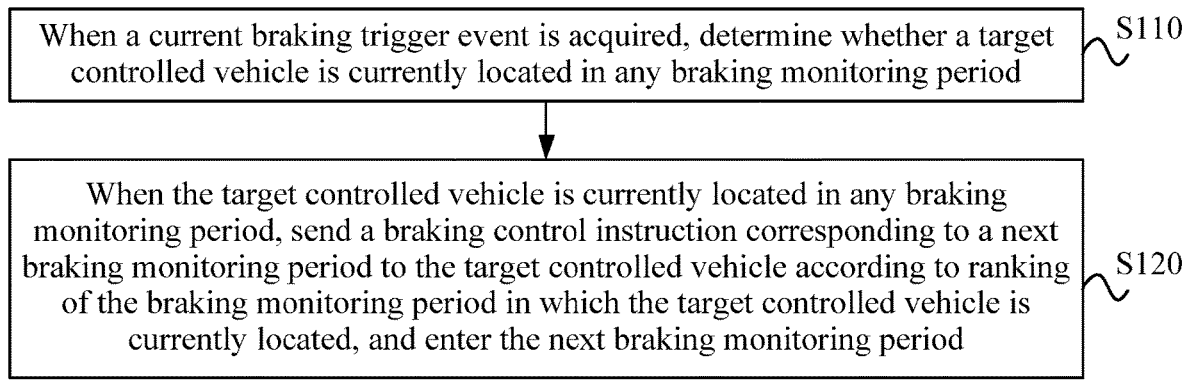
FIG. 1 is a flowchart of an automatic driving control method according to embodiment one of the present application.

FIG. 1 is a flowchart of an automatic driving control method according to embodiment one of the present application. This embodiment is applicable to the case of controlling self-driving vehicles. The method may be executed by an automatic driving control apparatus. The apparatus may be implemented in software and/or hardware and integrated into an electronic device having an application development function.

As shown in FIG. 1, the automatic driving control method includes the following steps.

In S110, when a current braking trigger event is acquired, whether a target controlled vehicle is currently located in any braking monitoring period is determined.

Exemplarily, the braking trigger event may be that braking is triggered when an obstacle is detected by an on-board distance sensor of a self-driving vehicle as the target controlled vehicle, and the distance between the self-driving vehicle and the obstacle is less than a certain threshold value, or when the data detected by another sensing apparatus meets a condition for triggering braking. The braking trigger event may also be that the self-driving vehicle fails to operate normally due to a system-level error in the control system of the self-driving vehicle, such as an unstable network or intermittent signals. In this case, the self-driving control system can only temporarily brake or stop the vehicle to avoid a larger vehicle accident.

In an embodiment, the step in which the current braking trigger event is acquired includes that the current braking trigger event is acquired when it is detected that the distance between the target controlled vehicle and an obstacle is less than a preset threshold value or a calculation result of control data of the target controlled vehicle is abnormal.

However, when there is more noise in the data detected by the distance sensor or other sensors, or when errors occur repeatedly after the system error is recovered, the self-driving vehicle is caused to go and stop under wrong control instructions, which is easy to cause traffic jams and has great potential safety hazards. Therefore, after the braking trigger event is acquired, it is necessary to determine how to respond to this braking trigger event to avoid frequent braking.

The braking monitoring periods are set according to continuous braking trigger events. The continuous braking trigger events in a certain time separately correspond to one braking monitoring period. The duration of each braking monitoring period is different. With the increase of the number of braking trigger events, the duration of a braking monitoring period is increased. The vehicle control duration in each braking monitoring period is different, that is, braking control instructions are different. Exemplarily, a first braking monitoring period is entered when a first braking trigger event is monitored after the target controlled vehicle is started and a first braking control instruction is sent to the target controlled vehicle. If a braking trigger event is acquired in the first braking monitoring period, a second braking control instruction is sent to the target controlled vehicle and a second braking monitoring period is entered. By analogy, until the braking trigger event is not acquired in one braking monitoring period, a final braking monitoring period is ended, and the state of the normal operation of the self-driving vehicle is returned.

Therefore, after the current braking trigger event is acquired, it is determined whether the self-driving vehicle is currently located in any braking monitoring period, and which braking monitoring period it is. It is to be understood that the time of a first braking trigger event after the starting of the self-driving vehicle is taken as the first braking trigger time. In this embodiment, if a braking trigger event is not monitored in any braking monitoring period, after the braking monitoring period ends, the first braking trigger event after the end of the braking monitoring period is also taken as the first braking trigger event, similar to the state in which the self-driving vehicle is just started. However, the first braking trigger event after the braking monitoring period is not the first braking trigger event during the operation of the self-driving vehicle.

In S120, when the target controlled vehicle is currently located in any braking monitoring period, a braking control instruction corresponding to a next braking monitoring period is sent to the target controlled vehicle according to ranking of the braking monitoring period in which the target controlled vehicle is currently located, and the next braking monitoring period is entered.

When it is determined that the target controlled vehicle is currently located in one braking monitoring period and the ranking of the braking monitoring period, the braking control instruction corresponding to the braking trigger event and the braking monitoring period corresponding to the braking trigger event may be determined. That is, the braking monitoring period is the next braking monitoring period of the braking monitoring period in which the target controlled vehicle is currently located. The braking control instruction corresponding to the next braking monitoring period is sent to the target controlled vehicle, and the next braking monitoring period is entered. The duration of the next braking monitoring period is greater than the duration of the braking monitoring period in which the target controlled vehicle is currently located. The vehicle control duration of the braking control instruction corresponding to the next braking monitoring period is greater than the vehicle control duration of the braking control instruction corresponding to the braking monitoring period in which the target controlled vehicle is currently located.

Exemplarily, if the current braking trigger event is the first braking trigger event, a first braking control instruction corresponding to the first braking trigger event is sent to the target controlled vehicle, and a first braking monitoring period is entered. The first braking control instruction is a cadence braking control instruction corresponding to first vehicle control duration. It is to be understood that the cadence braking control instruction is equivalent to tapping the brake with a foot and lifting the foot quickly when a person drives the vehicle. The first vehicle control duration is very short, and the vehicle does not stop immediately, but the speed is relatively reduced. Then, for the second, third or even more braking monitoring periods sequentially connected to the first braking monitoring period, the vehicle control duration of the corresponding braking control instruction gradually increases. For example, the vehicle control duration corresponding to the braking control instruction of the second braking monitoring period is 5 seconds, and the vehicle may be stopped directly after pressing on the brake for 5 seconds. The vehicle control duration corresponding to the braking control instruction of a later braking monitoring period is longer than 5 seconds, and the vehicle may be stopped and wait for a period of time.

It is to be noted that, for the case where the braking control instruction corresponding to each first braking trigger event is a cadence braking control instruction, first braking trigger events default to the self-driving control system are normal braking trigger events. If braking trigger events are subsequently continuously monitored, different braking monitoring periods are started, and different braking control instructions are sent to the self-driving vehicle. Thus, frequent braking due to an unstable network or noise data interference of a sensor is avoided. If the braking is triggered, the penalty time is continuously increased from the cadence braking which takes a short time to the stopping braking and waiting which takes a long time. That is, when the parking condition is triggered multiple times in a certain period, the penalty time is continuously increased so that the vehicle control system has some buffering time to correct the calculation error of the data or wait for the network to recover stability. As a result, frequent cadence braking in a short period of time can be prevented, and the occurrence of congestion caused by long parking time can be avoided.

According to the technical scheme in this embodiment, when the current braking trigger event is acquired, whether the target controlled vehicle is currently located in any braking monitoring period is determined; when the target controlled vehicle is currently located in any braking monitoring period, the braking control instruction corresponding to the next braking monitoring period is sent to the target controlled vehicle according to the ranking of the braking monitoring period in which the target controlled vehicle is currently located; and the next braking monitoring period is entered, where the duration of the next braking monitoring period is greater than the duration of the braking monitoring period in which the target controlled vehicle is currently located, and the vehicle control duration of the braking control instruction corresponding to the next braking monitoring period is greater than the vehicle control duration of the braking control instruction corresponding to the braking monitoring period in which the target controlled vehicle is currently located. Thus, the issue of frequent braking due to the unstable network or the interference of the noise data of the sensor is solved. For the case where parking conditions are triggered for multiple times in a certain period, the penalty time for each parking is continuously increased, thereby preventing frequent cadence braking in a short period of time and avoiding the occurrence of congestion caused by long parking time.

Embodiment Two

Figure 2A:
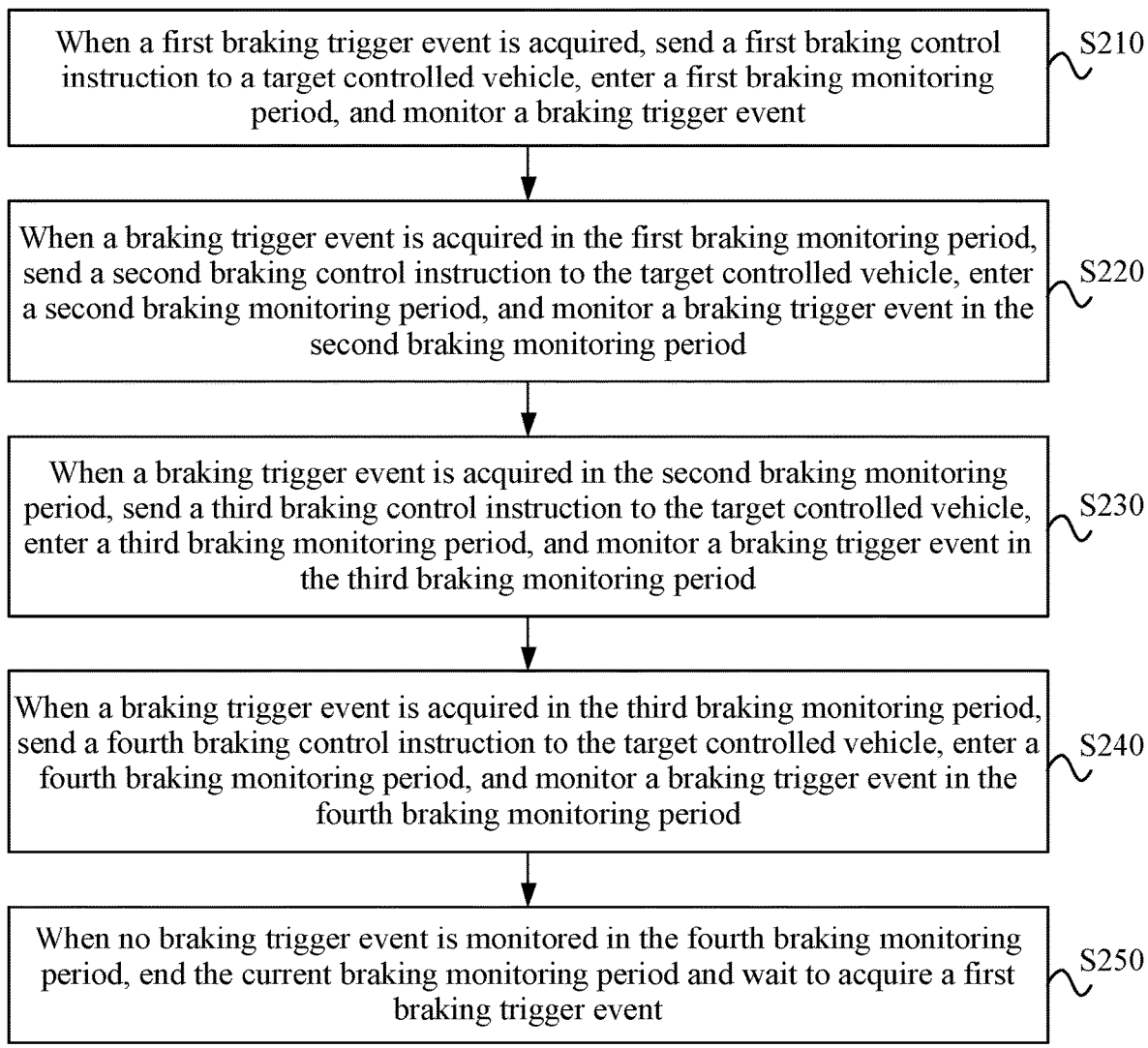
FIG. 2A is a flowchart of an automatic driving control method according to embodiment two of the present application.

FIG. 2A is a flowchart of an automatic driving control method according to embodiment two of the present application. This embodiment is applicable to the case of controlling self-driving vehicles. Description is performed on a braking control process. The automatic driving control method in this embodiment belongs to the same inventive concept as the automatic driving control method in the preceding embodiment. The method may be executed by an automatic driving control apparatus. The apparatus may be implemented in software and/or hardware and integrated into a server having an application development function.

As shown in FIG. 2A, the automatic driving control method includes the following steps.

In S210, when a first braking trigger event is acquired, a first braking control instruction is sent to a target controlled vehicle, a first braking monitoring period is entered, and a braking trigger event is monitored.

Exemplarily, a logic module is disposed in the self-driving vehicle, the logic module is configured to control the driving safety of the vehicle, and the logic module may be an autonomous safety module independent of the driving control module of the vehicle and is equivalent to a protective umbrella to ensure the parking bottom line and basic safety of the vehicle. The module may send a vehicle control instruction to the chassis (the transmission and control apparatus of the vehicle). The vehicle control instruction includes parameters for controlling the driving state of the chassis, such as braking force and vehicle control duration. The autonomous safety module includes a trigger unit, a detection unit, and a control unit.

Exemplarily, the trigger unit is configured to determine whether the vehicle triggers autonomous safe parking conditions. For example, the autonomous safe parking conditions include the following: the distance between the vehicle and an obstacle is relatively short, the distance between an obstacle and the vehicle is less than a threshold value, or an abnormality occurs in an intelligent vehicle system (including software system, algorithm and hardware). If one of the preceding conditions is satisfied, the trigger unit considers that the autonomous safe parking is triggered, and the trigger unit sends a message indicating that braking is required to a monitoring unit. The monitoring unit is responsible for monitoring, in an autonomous safe braking method (that is, the automatic driving control method in the present application), which braking monitoring period is currently in, and calculating the time of the braking monitoring period, vehicle control duration, penalty parking duration, and the like. Finally, the control unit is responsible for sending a braking control instruction to the chassis, and then the vehicle chassis executes the instruction.

In this step, the trigger unit acquires the braking trigger event. The monitoring unit determines whether the vehicle is currently located in any braking monitoring period. If the conclusion is no, it can be determined that the braking trigger event is the first braking trigger event. The first braking trigger event may be the first braking trigger event after the starting of the self-driving vehicle or may be the first braking trigger event after the end of any braking monitoring period. A first braking control instruction corresponding to the first braking trigger event is a cadence braking control instruction corresponding to first vehicle control duration tp0. Then, the control unit sends a vehicle control instruction (that is, the first braking control instruction) composed of the first vehicle control duration and other vehicle control parameters (for example, speed, parking angle, or other driving control parameters of the vehicle) to the chassis of the vehicle. The chassis is notified to complete a cadence braking action. Because of the cadence braking, the vehicle can decelerate but not necessarily stop. tp0 is small herein. At the same time, the monitoring unit enters the first braking monitoring period and starts to monitor the duration of period TO by counting down. If the message of the trigger unit acquiring a new braking trigger event is not received in the period, the period automatically times out, the braking action is released, the braking monitoring period is ended, and the autonomous safe braking method is exited.

In S220, when a braking trigger event is acquired in the first braking monitoring period, a second braking control instruction is sent to the target controlled vehicle, a second braking monitoring period is entered, and a braking trigger event is monitored in the second braking monitoring period.

The braking trigger event is acquired in the first braking monitoring period, that is, braking is triggered for a second time. The second braking control instruction is a stopping braking control instruction and corresponds to second vehicle control duration for the target controlled vehicle to stop. The monitoring unit sets the second vehicle control duration to tp1 and sends the vehicle control duration to the control unit. The control unit sends a vehicle control instruction (that is, the second braking control instruction) composed of the vehicle control duration and other vehicle control parameters to the chassis of the vehicle. Regardless of whether the last braking action is completed, the chassis is notified that tp0 has failed. The vehicle control duration is changed to tp1, and tp1>tp0. The chassis is notified to complete the stopping braking action. At the same time, the monitoring unit enters the second braking monitoring period, starts to monitor the duration of period T1 by counting down, and monitors a braking trigger event in the second braking monitoring period.

In S230, when a braking trigger event is acquired in the second braking monitoring period, a third braking control instruction is sent to the target controlled vehicle, a third braking monitoring period is entered, and a braking trigger event is monitored in the third braking monitoring period.

The braking trigger event is acquired in the second braking monitoring period, that is, braking is triggered for a third time. Correspondingly, the third braking control instruction is a stopping braking and wait control instruction and corresponds to third vehicle control duration tp2 for the target controlled vehicle to stop and wait. The monitoring unit sets the vehicle control duration to tp2 and sends the vehicle control duration to the control unit. The control unit sends a vehicle control instruction (that is, the third braking control instruction) composed of the vehicle control duration and other vehicle control parameters to the chassis of the vehicle. Regardless of whether the last braking action is completed, the chassis is notified that tp1 has failed. The vehicle control duration is changed to tp2, and tp2>=tp1. The chassis is notified to complete the stopping braking and waiting action. At the same time, the monitoring unit enters the third braking monitoring period, starts to monitor the duration of period T2 by counting down, and monitors a braking trigger event in the third braking monitoring period.

In S240, when a braking trigger event is acquired in the third braking monitoring period, a fourth braking control instruction is sent to the target controlled vehicle, a fourth braking monitoring period is entered, and a braking trigger event is monitored in the fourth braking monitoring period.

The braking trigger event is acquired in the third braking monitoring period, that is, braking is triggered for a fourth time. Correspondingly, the fourth braking control instruction is a stopping braking and waiting control instruction and corresponds to fourth vehicle control duration tp3 for the target controlled vehicle to stop and wait. The monitoring unit sets the vehicle control duration to tp3 and sends the vehicle control duration to the control unit. The control unit sends a vehicle control instruction composed of the vehicle control duration and other vehicle control parameters to the chassis of the vehicle. Regardless of whether the last braking action is completed, the chassis is notified that tp2 has failed. The vehicle control duration is changed to tp3, and tp3>=tp2. The chassis is notified to complete the stopping braking and waiting action. If tp3=tp2, the remaining vehicle control duration is +t, where t is a preset delay duration. That is, that the monitoring unit determines the vehicle control duration corresponding to the next braking monitoring period of the braking monitoring period in which the target controlled vehicle is currently located according to the remaining vehicle control duration in the current braking monitoring period is that the remaining vehicle control duration and the preset delay duration are superimposed to obtain a superimposed result and the superimposed result is used as the vehicle control duration corresponding to the next braking monitoring period of the braking monitoring period in which the target controlled vehicle is currently located. Further, a stopping braking and waiting control instruction is sent to the chassis of the target controlled vehicle, a next braking monitoring period is entered, and a braking trigger event is monitored.

In an embodiment, when the ranking of the braking monitoring period in which the target controlled vehicle is currently located is greater than or equal to three, the step in which the braking control instruction corresponding to the next braking monitoring period is sent to the target controlled vehicle according to the ranking of the braking monitoring period in which the target controlled vehicle is currently located, and the next braking monitoring period is entered includes that the remaining vehicle control duration corresponding to the braking monitoring period in which the target controlled vehicle is currently located is determined according to the acquired time of the current braking trigger event; the vehicle control duration corresponding to the next braking monitoring period of the braking monitoring period in which the target controlled vehicle is currently located is determined according to the remaining vehicle control duration; and a stopping braking and waiting control instruction is sent to the target controlled vehicle, the next braking monitoring period is entered, and a braking trigger event is monitored, where the stopping braking and waiting control instruction corresponds to the vehicle control duration determined according to the remaining vehicle control duration.

Similarly, when a braking trigger event is monitored in a subsequent braking monitoring period, the monitoring unit calculates and increases the parking wait duration as vehicle control duration, and sends the vehicle control duration to the control unit. The control unit sends a vehicle control instruction composed of the vehicle control duration and other vehicle control parameters to the chassis of the vehicle. Regardless of whether the last braking action is completed, the chassis is notified that the last vehicle control duration has failed. The vehicle control duration is changed to the vehicle control duration obtained by calculation. The vehicle chassis is notified to continue stopping and waiting. At the same time, the monitoring unit starts to monitor the duration of a new braking monitoring period by counting down. The vehicle control duration tpf of the final braking monitoring period is equal to the duration of the final braking monitoring period Tf.

In S250, in the fourth braking monitoring period, no braking trigger event is monitored, the current braking monitoring period is ended, and a first braking trigger event is waited to acquire.

If the fourth braking monitoring period does not receive the braking message of the trigger unit acquiring a braking trigger event, the fourth braking monitoring period automatically times out, the braking is released, the braking monitoring period is ended, and the autonomous safe braking method is exited. If the braking is triggered after the method is exited, it is considered that the braking is triggered for the first time. The autonomous safe braking method is executed from step S210.

It is to be understood that when no new braking trigger event is monitored in any monitoring period in steps S210 to S230, the operation of this step may be executed. That is, the braking is released, the braking monitoring period is ended, and the autonomous safe braking method is exited.

Figure 2B:
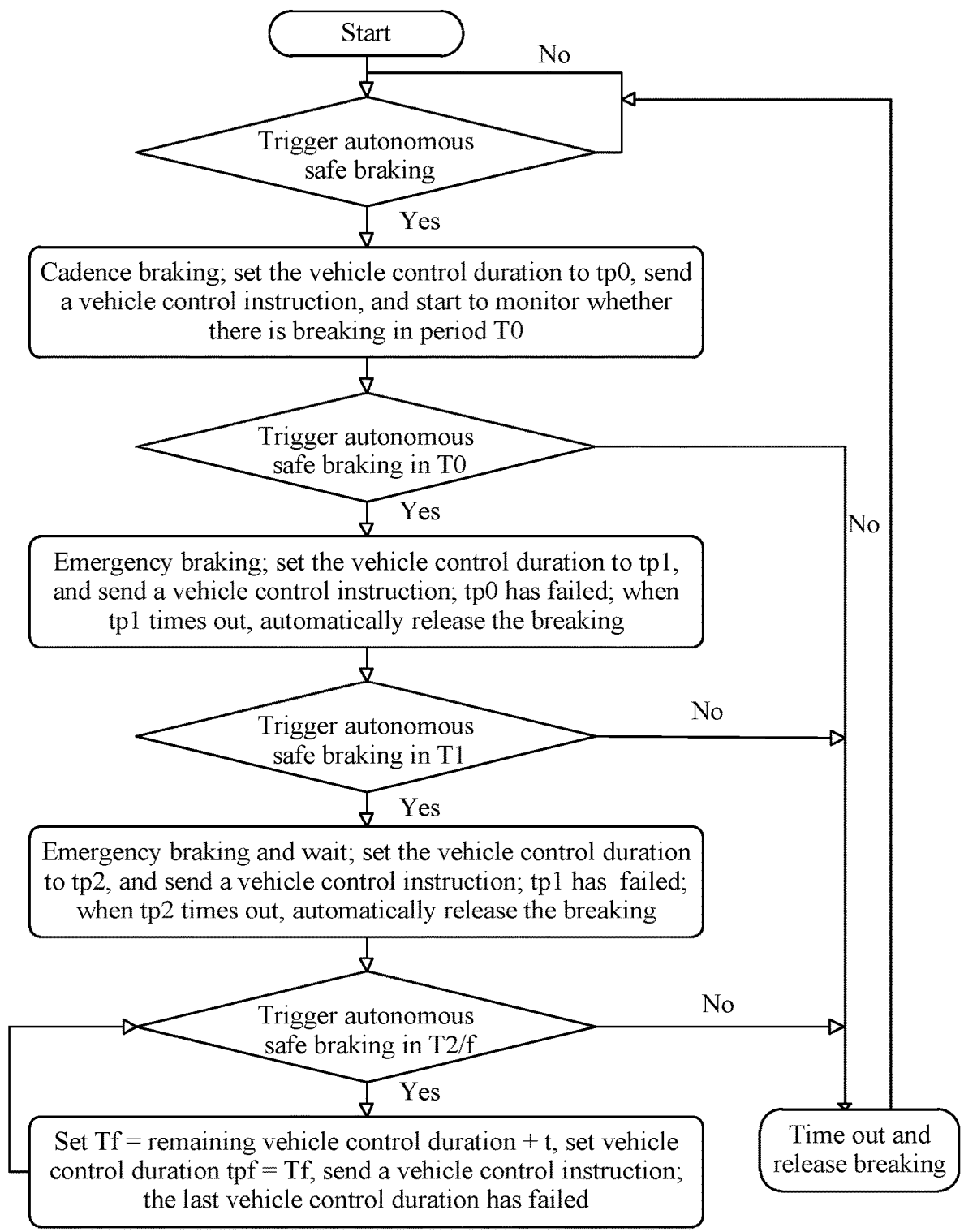
FIG. 2B is a flowchart of another automatic driving control method according to embodiment two of the present application.

Alternatively, referring to the flowchart of an automatic driving control method shown in FIG. 2B, an autonomous safe braking method may be executed from the start of a first braking trigger event. Generally, in most cases, the third braking monitoring period T2 is the last braking monitoring period Tf. When the braking monitoring period ends and no braking trigger event is monitored, it is considered that the monitoring period times out and the braking is released, that is, the autonomous safe braking method is exited.

According to the technical scheme in this embodiment, when the current braking trigger event is acquired, whether the target controlled vehicle is currently located in any braking monitoring period is determined; when the target controlled vehicle is currently located in any braking monitoring period, the braking control instruction corresponding to the next braking monitoring period is sent to the target controlled vehicle according to the ranking of the braking monitoring period in which the target controlled vehicle is currently located; and the next braking monitoring period is entered. The braking control instruction of the first braking monitoring period is cadence braking. The braking control instruction of the second braking monitoring period is the stopping braking. The braking control instructions of the third and subsequent braking monitoring periods are the stopping braking and waiting. In combination with the cadence braking and the stopping braking, the cadence braking can save time and make the vehicle pass quickly, and the stopping braking can avoid collision and use parking time to alleviate frequent braking. In this case, the shortcomings of the two are avoided. The issue of frequent braking due to the unstable network or the interference of the noise data of a sensor is solved. For the case where parking conditions are triggered for multiple times in a certain period, the penalty time for each parking is continuously increased, thereby preventing frequent cadence braking in a short period of time and avoiding the occurrence of congestion caused by long parking time.

The following is an embodiment of an automatic driving control apparatus according to an embodiment of the present application. The apparatus and the automatic driving control method in the preceding embodiments belong to the same application concept. The apparatus can implement the automatic driving control method in the preceding embodiments. For details that are not described in detail in the embodiment of the automatic driving control apparatus, reference may be made to the preceding embodiments of the automatic driving control method.

Embodiment Three

Figure 3:
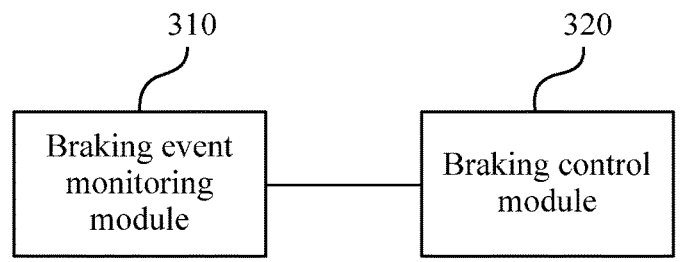
FIG. 3 is a diagram illustrating the structure of an automatic driving control apparatus according to embodiment three of the present application.

FIG. 3 is a diagram illustrating the structure of an automatic driving control apparatus according to embodiment three of the present application. This embodiment is applicable to the case of controlling self-driving vehicles.

As shown in FIG. 3, the automatic driving control apparatus includes a braking event monitoring module 310 and a braking control module 320.

The braking event monitoring module 310 is configured to, in response to acquiring a current braking trigger event, determine whether a target controlled vehicle is currently located in any braking monitoring period, where when a first braking trigger event is monitored after the target controlled vehicle is started and a first braking control instruction is sent to the target controlled vehicle, a first braking monitoring period is entered. The braking control module 320 is configured to, in response to that the target controlled vehicle is currently located in any braking monitoring period, send a braking control instruction corresponding to a next braking monitoring period to the target controlled vehicle according to ranking of the braking monitoring period in which the target controlled vehicle is currently located, and enter the next braking monitoring period. The duration of the next braking monitoring period is greater than the duration of the braking monitoring period in which the target controlled vehicle is currently located. The vehicle control duration of the braking control instruction corresponding to the next braking monitoring period is greater than the vehicle control duration of the braking control instruction corresponding to the braking monitoring period in which the target controlled vehicle is currently located.

When the current braking trigger event is acquired, whether the target controlled vehicle is currently located in any braking monitoring period is determined. When the target controlled vehicle is currently located in any braking monitoring period, the braking control instruction corresponding to the next braking monitoring period is sent to the target controlled vehicle according to the ranking of the braking monitoring period in which the target controlled vehicle is currently located. The next braking monitoring period is entered. The duration of the next braking monitoring period is greater than the duration of the braking monitoring period in which the target controlled vehicle is currently located. The vehicle control duration of the braking control instruction corresponding to the next braking monitoring period is greater than the vehicle control duration of the braking control instruction corresponding to the braking monitoring period in which the target controlled vehicle is currently located. Thus, the issue of frequent braking due to the unstable network or the interference of the noise data of the sensor is solved. For the case where parking conditions are triggered for multiple times in a certain period, the penalty time for each parking is continuously increased, thereby preventing frequent cadence braking in a short period of time and avoiding the occurrence of congestion caused by long parking time.

In an embodiment, when the target controlled vehicle is not currently located in any braking monitor period, the braking control module 320 is further configured to use the current braking trigger event as the first braking trigger event, send the first braking control instruction to the target controlled vehicle, and enter the first braking monitoring period.

The first braking control instruction is a cadence braking control instruction and corresponds to first vehicle control duration.

In an embodiment, when the target controlled vehicle is currently located in the first braking monitoring period, the braking control module 320 is configured to send a second braking control instruction to the target controlled vehicle, enter a second braking monitoring period, and monitor a braking trigger event in the second braking monitoring period, where the second braking control instruction is a stopping braking control instruction and corresponds to second vehicle control duration for the target controlled vehicle to stop.

In an embodiment, when the target controlled vehicle is currently located in the second braking monitoring period, the braking control module 320 is configured to send a third braking control instruction to the target controlled vehicle, enter a third braking monitoring period, and monitor a braking trigger event in the third braking monitoring period, where the third braking control instruction is a stopping braking and waiting control instruction and corresponds to third vehicle control duration for the target controlled vehicle to stop and wait.

In an embodiment, when the ranking of the braking monitoring period in which the target controlled vehicle is currently located is greater than or equal to three, the braking control module 320 is further configured to determine the remaining vehicle control duration corresponding to the braking monitoring period in which the target controlled vehicle is currently located according to the acquired time of the current braking trigger event; determine, according to the remaining vehicle control duration, the vehicle control duration corresponding to the next braking monitoring period of the braking monitoring period in which the target controlled vehicle is currently located; and send a stopping braking and waiting control instruction to the target controlled vehicle, enter the next braking monitoring period, and monitor a braking trigger event, where the stopping braking and waiting control instruction corresponds to the vehicle control duration determined according to the remaining vehicle control duration.

In an embodiment, the braking control module 320 is configured to superimpose the remaining vehicle control duration and preset delay duration to obtain a superimposed result, and use the superimposed result as the vehicle control duration corresponding to the next braking monitoring period of the braking monitoring period in which the target controlled vehicle is currently located.

In an embodiment, the automatic driving control includes a braking event monitoring module. The braking event monitoring module is configured to acquire the current braking trigger event when it is detected that a distance between the target controlled vehicle and an obstacle is less than a preset threshold value or a calculation result of control data of the target controlled vehicle is abnormal.

The automatic driving control apparatus according to this embodiment of the present application may perform the automatic driving control method according to any one of the embodiments of the present application and has functional modules corresponding to the executed method.

Embodiment Four

Figure 4:
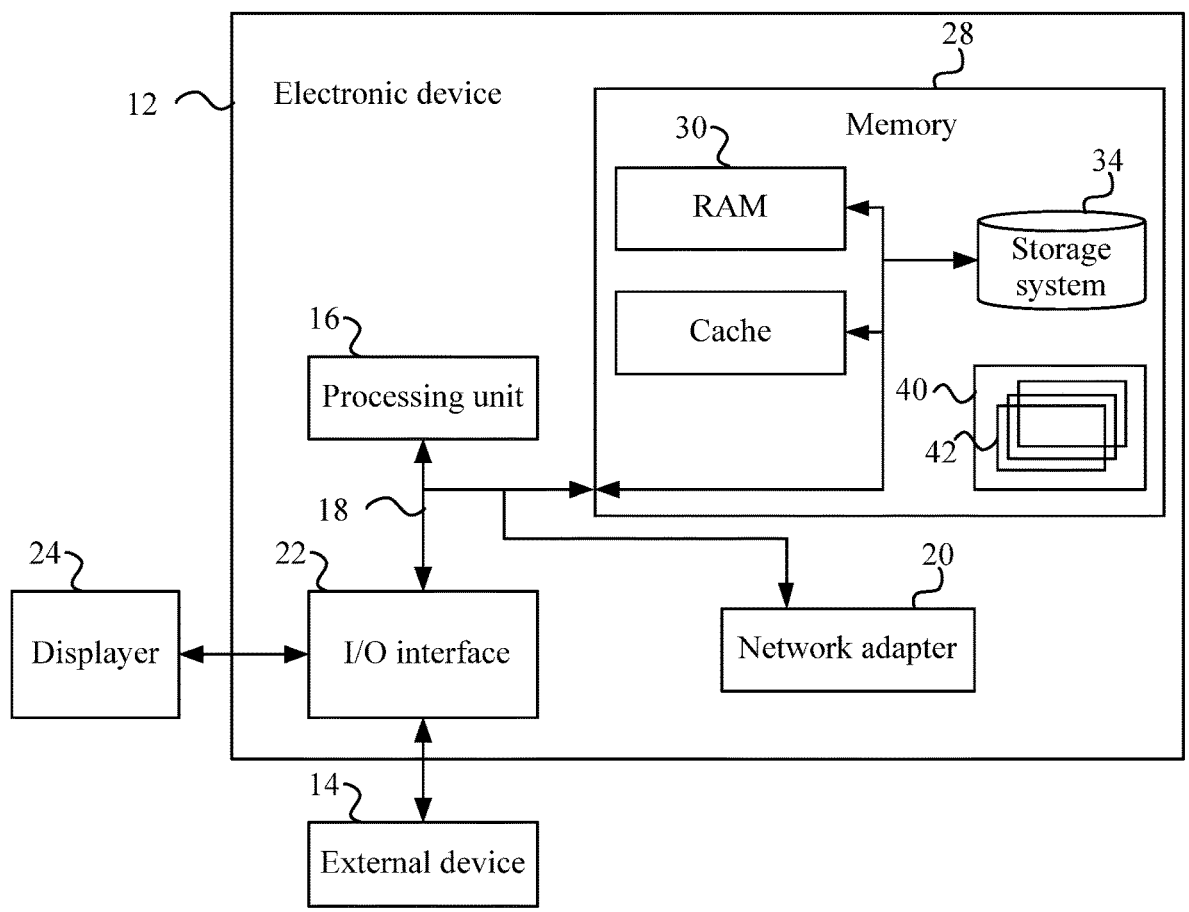
FIG. 4 is a diagram illustrating the structure of an electronic device according to embodiment four of the present invention.

FIG. 4 is a diagram illustrating the structure of an electronic device according to embodiment four of the present application. Exemplarily, FIG. 4 shows a block diagram of an electronic device 12 for implementing embodiments of the present application. The electronic device 12 shown in FIG. 4 is merely an example and is not intended to limit the function and use scope of the embodiments of the present application. The electronic device 12 may be any terminal device having a computing capability, such as an intelligent controller, a server, or a mobile phone.

As shown in FIG. 4, the electronic device 12 may take a form of a general-purpose computer device. Components of the electronic device 12 may include, but are not limited to, at least one processor or processing unit 16, a system memory 28, and a bus 18 connecting different system components (including the system memory 28 and the at least one processing unit 16).

The bus 18 represents at least one of several types of bus structures, including a memory bus or memory controller, a peripheral bus, an accelerated graphics port, and a processor or local bus using any of a variety of bus architectures. For example, these architectures include, but are not limited to, an industry standard architecture (ISA) bus, a micro channel architecture (MAC) bus, an enhanced ISA bus, a video electronics standards association (VESA) local bus, and a peripheral component interconnect (PCI) bus.

The electronic device 12 typically includes multiple computer system readable media. These media may be available media that can be accessed by the electronic device 12. These media include volatile and non-volatile media, and removable and non-removable media.

The system memory 28 may include computer system readable media in the form of volatile memory, such as random access memory (RAM) 30 and/or a cache 32. The electronic device 12 may include other removable/non-removable, volatile/non-volatile computer system storage media. Just for example, a storage system 34 may be configured to perform reading and writing on a non-removable and non-volatile magnetic medium (not shown in FIG. 4 and usually referred to as a "hard disk driver"). Although not shown in FIG. 4, it is feasible to provide not only a magnetic disk driver for performing reading and writing on a removable non-volatile magnetic disk (for example, a "floppy disk"), but also an optical disk driver for performing reading and writing on a removable non-volatile optical disk (for example a compact disc read-only memory (CD-ROM), a digital video disc-read only memory (DVD-ROM) or other optical media). In these cases, each driver may be connected to the bus 18 via at least one data media interface. The system memory 28 may include at least one program product having a group (for example, at least one) of program modules. These program modules are configured to perform functions of various embodiments of the present application.

A program/utility 40 with a group (at least one) of program modules 42, including, and not limited to, an operating system, at least one application, other program modules, and program data, may be stored, for example, in the system memory 28. Each or some combination of the examples may include an implementation of a network environment. Each program module 42 generally performs functions and/or methods in embodiments of the present invention.

The electronic device 12 may also communicate with at least one external device 14 (for example, a keyboard, a pointing terminal, or a displayer 24). The electronic device 12 may also communicate with at least one device that enables a user to interact with the electronic device 12 and/or communicate with any device (for example, a network card or a modem) that enables the electronic device 12 to communicate with at least one of other computing devices. Such communication may be performed through an input/output (I/O) interface 22. Moreover, the electronic device 12 may communicate with at least one network (for example, a local area network (LAN), a wide area network (WAN), and/or a public network such as the Internet) through a network adapter 20. As shown in the figure, the network adapter 20 communicates with other modules of the electronic device 12 via the bus 18. It is to be understood that although not shown in the figure, other hardware and/or software modules may be used in conjunction with the electronic device 12. The other hardware and/or software modules include, and are not limited to, microcode, a device driver, a redundant processor, an external disk drive array, a redundant arrays of independent disks (RAID) system, a tape driver, and a data backup storage system.

The at least one processing unit 16 executes a program stored in the system memory 28 to perform various functional applications and data processing, for example, to perform steps of an automatic driving control method provided in embodiments of the present application. The method includes that: when a current braking trigger event is acquired, whether a target controlled vehicle is currently located in any braking monitoring period is determined, where when a first braking trigger event is monitored after the target controlled vehicle is started and a first braking control instruction is sent to the target controlled vehicle, a first braking monitoring period is entered; and when the target controlled vehicle is currently located in any braking monitoring period, a braking control instruction corresponding to a next braking monitoring period is sent to the target controlled vehicle according to ranking of the braking monitoring period in which the target controlled vehicle is currently located, and the next braking monitoring period is entered, where duration of the next braking monitoring period is greater than duration of the braking monitoring period in which the target controlled vehicle is currently located, and vehicle control duration of the braking control instruction corresponding to the next braking monitoring period is greater than vehicle control duration of the braking control instruction corresponding to the braking monitoring period in which the target controlled vehicle is currently located.

In an embodiment, the at least one processing unit 16 executes a program stored in the system memory 28 to implement the automatic driving control method described in any embodiment of the present application.

Embodiment Five

The embodiment five provides a computer-readable storage medium storing a computer program which, when executed by a processor, implements the automatic driving control method provided in any embodiment of the present application. The method includes, that: when a current braking trigger event is acquired, whether a target controlled vehicle is currently located in any braking monitoring period is determined, where when a first braking trigger event is monitored after the target controlled vehicle is started and a first braking control instruction is sent to the target controlled vehicle, a first braking monitoring period is entered; and when the target controlled vehicle is currently located in any braking monitoring period, a braking control instruction corresponding to a next braking monitoring period is sent to the target controlled vehicle according to ranking of the braking monitoring period in which the target controlled vehicle is currently located, and the next braking monitoring period is entered, where duration of the next braking monitoring period is greater than duration of the braking monitoring period in which the target controlled vehicle is currently located, and vehicle control duration of the braking control instruction corresponding to the next braking monitoring period is greater than vehicle control duration of the braking control instruction corresponding to the braking monitoring period in which the target controlled vehicle is currently located.

The computer storage medium in the embodiments of the present application may use any combination of at least one computer-readable medium. The computer-readable medium may be a computer-readable signal medium or a computer-readable storage medium. The computer-readable storage medium may be, but is not limited to, an electrical, magnetic, optical, electromagnetic, infrared or semiconductor system, apparatus, or device, or any combination thereof. More specific examples of the computer-readable storage medium include (non-exhaustive list) an electrical connection having at least one wire, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical memory device, a magnetic memory device, or any suitable combination thereof. In this document, the computer-readable storage medium may be any tangible medium including or storing a program. The program may be used by or used in conjunction with an instruction execution system, apparatus, or device.

A computer-readable signal medium may include a data signal propagated in a baseband or as part of a carrier. Computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium except the computer-readable storage medium. The computer-readable medium may send, propagate, or transmit a program used by or used in conjunction with an instruction execution system, apparatus, or device.

The program codes included on the computer-readable medium may be transmitted by using any suitable medium, including, but not limited to, a wireless medium, a wired medium, an optical cable, radio frequency (RF), and the like, or any suitable combination thereof.

Computer program code for performing the operations of the present application may be written in at least one programming languages or combination thereof, including object-oriented programming languages such as Java, Smalltalk, C++, as well as conventional procedural programming languages such as "C" or similar programming languages. Program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer via any type of network including a local area network (LAN) or a wide area network (WAN) or may be connected to an external computer (for example, via the Internet provided by an Internet service provider).

Those of ordinary skill in the art should know that the preceding modules or steps of the present application may be implemented by a general-purpose computing apparatus. The modules or steps may be concentrated on a single computing apparatus or distributed on a network composed of multiple computing apparatuses. Optionally, the modules or steps may be implemented by program codes executable by the computing apparatus, and thus the modules or steps may be stored in a storage apparatus and executed by the computing apparatus. Alternatively, the modules or steps may be made into integrated circuit modules separately, or multiple modules or steps therein may be made into a single integrated circuit module for implementation. In this manner, the present application is not limited to any specific combination of hardware and software.

What is claimed is:

1. An automatic driving control method, comprising:
   in response to acquiring a current braking trigger event, determining whether a target controlled vehicle is currently located in a braking monitoring period, wherein in response to a first braking trigger event being monitored after the target controlled vehicle is started and a first braking control instruction being sent to the target controlled vehicle, a first braking monitoring period is entered; and
   in response to the target controlled vehicle being currently located in a braking monitoring period, sending a braking control instruction corresponding to a next braking monitoring period to the target controlled vehicle according to ranking of the braking monitoring period in which the target controlled vehicle is currently located, and entering the next braking monitoring period; wherein duration of the next braking monitoring period is greater than duration of the braking monitoring period in which the target controlled vehicle is currently located, and vehicle control duration of the braking control instruction corresponding to the next braking monitoring period is greater than vehicle control duration of a braking control instruction corresponding to the braking monitoring period in which the target controlled vehicle is currently located;
   wherein in response to the ranking of the braking monitoring period in which the target controlled vehicle is currently located being greater than or equal to three, sending the braking control instruction corresponding to the next braking monitoring period to the target controlled vehicle according to the ranking of the braking monitoring period in which the target controlled vehicle is currently located, and entering the next braking monitoring period comprises:
      determining remaining vehicle control duration corresponding to the braking monitoring period in which the target controlled vehicle is currently located according to acquired time of the current braking trigger event;
      determining, according to the remaining vehicle control duration, vehicle control duration corresponding to a next braking monitoring period of the braking monitoring period in which the target controlled vehicle is currently located; and
      sending a stopping braking and waiting control instruction to the target controlled vehicle, entering the next braking monitoring period, and monitoring a braking trigger event;
   wherein the stopping braking and waiting control instruction corresponds to vehicle control duration determined according to the remaining vehicle control duration; and
   wherein determining, according to the remaining vehicle control duration, the vehicle control duration corresponding to the next braking monitoring period of the braking monitoring period in which the target controlled vehicle is currently located comprises:
      superimposing the remaining vehicle control duration and preset delay duration to obtain a superimposed result, and using the superimposed result as the vehicle control duration corresponding to the next braking monitoring period of the braking monitoring period in which the target controlled vehicle is currently located.

2. The method of claim 1, in response to the target controlled vehicle being not currently located in a braking monitoring period, further comprising:
   using the current braking trigger event as the first braking trigger event, sending the first braking control instruction to the target controlled vehicle, and entering the first braking monitoring period;
   wherein the first braking control instruction is a cadence braking control instruction and corresponds to first vehicle control duration.

3. The method of claim 1, wherein in response to the target controlled vehicle being currently located in the first braking monitoring period, sending the braking control instruction corresponding to the next braking monitoring period to the target controlled vehicle according to the ranking of the braking monitoring period in which the target controlled vehicle is currently located, and entering the next braking monitoring period comprises:
   sending a second braking control instruction to the target controlled vehicle, entering a second braking monitoring period, and monitoring a braking trigger event in the second braking monitoring period;
   wherein the second braking control instruction is a stopping braking control instruction and corresponds to second vehicle control duration for the target controlled vehicle to stop.

4. The method of claim 3, wherein in response to the target controlled vehicle being currently in the second braking monitoring period, sending the braking control instruction corresponding to the next braking monitoring period to the target controlled vehicle according to the ranking of the braking monitoring period in which the target controlled vehicle is currently located, and entering the next braking monitoring period comprises:
   sending a third braking control instruction to the target controlled vehicle, entering a third braking monitoring period, and monitoring a braking trigger event in the third braking monitoring period;
   wherein the third braking control instruction is a stopping braking and waiting control instruction and corresponds to third vehicle control duration for the target controlled vehicle to stop and wait.

5. The method of claim 1, further comprising:
   acquiring the current braking trigger event in response to detecting that a distance between the target controlled vehicle and an obstacle is less than a preset threshold value or in response to a calculation result of control data of the target controlled vehicle being abnormal.

6. An electronic device, comprising:
   at least one processor; and
   a memory configured to store at least one program,
   wherein the at least one program, when executed by the at least one processor, causes the at least one processor to implement:
      in response to acquiring a current braking trigger event, determining whether a target controlled vehicle is currently located in a braking monitoring period, wherein in response to a first braking trigger event being monitored after the target controlled vehicle is started and a first braking control instruction being sent to the target controlled vehicle, a first braking monitoring period is entered; and in response to the target controlled vehicle being currently located in a braking monitoring period, sending a braking control instruction corresponding to a next braking monitoring period to the target controlled vehicle according to ranking of the braking monitoring period in which the target controlled vehicle is currently located, and entering the next braking monitoring period;

wherein duration of the next braking monitoring period is greater than duration of the braking monitoring period in which the target controlled vehicle is currently located, and vehicle control duration of the braking control instruction corresponding to the next braking monitoring period is greater than vehicle control duration of a braking control instruction corresponding to the braking monitoring period in which the target controlled vehicle is currently located;

wherein the at least one program, when executed by the at least one processor, causes the at least one processor to implement, in response to the ranking of the braking monitoring period in which the target controlled vehicle is currently located being greater than or equal to three, sending the braking control instruction corresponding to the next braking monitoring period to the target controlled vehicle according to the ranking of the braking monitoring period in which the target controlled vehicle is currently located, and entering the next braking monitoring period in the following way:

determining remaining vehicle control duration corresponding to the braking monitoring period in which the target controlled vehicle is currently located according to acquired time of the current braking trigger event;

determining, according to the remaining vehicle control duration, vehicle control duration corresponding to a next braking monitoring period of the braking monitoring period in which the target controlled vehicle is currently located; and sending a stopping braking and waiting control instruction to the target controlled vehicle, entering the next braking monitoring period, and monitoring a braking trigger event;

wherein the stopping braking and waiting control instruction corresponds to vehicle control duration determined according to the remaining vehicle control duration; and wherein the at least one program, when executed by the at least one processor, causes the at least one processor to implement determining, according to the remaining vehicle control duration, the vehicle control duration corresponding to the next braking monitoring period of the braking monitoring period in which the target controlled vehicle is currently located in the following way;

superimposing the remaining vehicle control duration and preset delay duration to obtain a superimposed result, and using the superimposed result as the vehicle control duration corresponding to the next braking monitoring period of the braking monitoring period in which the target controlled vehicle is currently located.

7. The electronic device of claim 6, wherein the at least one program, when executed by the at least one processor, causes the at least one processor to, in response to the target controlled vehicle being not currently located in a braking monitoring period, further implement:

using the current braking trigger event as the first braking trigger event, sending the first braking control instruction to the target controlled vehicle, and entering the first braking monitoring period;

wherein the first braking control instruction is a cadence braking control instruction and corresponds to first vehicle control duration.

8. The electronic device of claim 6, wherein the at least one program, when executed by the at least one processor, causes the at least one processor to implement, in response to the target controlled vehicle being currently located in the first braking monitoring period, sending the braking control instruction corresponding to the next braking monitoring period to the target controlled vehicle according to the ranking of the braking monitoring period in which the target controlled vehicle is currently located, and entering the next braking monitoring period in the following way:

sending a second braking control instruction to the target controlled vehicle, entering a second braking monitoring period, and monitoring a braking trigger event in the second braking monitoring period;

wherein the second braking control instruction is a stopping braking control instruction and corresponds to second vehicle control duration for the target controlled vehicle to stop.

9. The electronic device of claim 8, wherein the at least one program, when executed by the at least one processor, causes the at least one processor to implement, in response to the target controlled vehicle being currently in the second braking monitoring period, sending the braking control instruction corresponding to the next braking monitoring period to the target controlled vehicle according to the ranking of the braking monitoring period in which the target controlled vehicle is currently located, and entering the next braking monitoring period in the following way:

sending a third braking control instruction to the target controlled vehicle, entering a third braking monitoring period, and monitoring a braking trigger event in the third braking monitoring period;

wherein the third braking control instruction is a stopping braking and waiting control instruction and corresponds to third vehicle control duration for the target controlled vehicle to stop and wait.

10. The electronic device of claim 6, wherein the at least one program, when executed by the at least one processor, causes the at least one processor to further implement:

acquiring the current braking trigger event in response to detecting that a distance between the target controlled vehicle and an obstacle is less than a preset threshold value or in response to a calculation result of control data of the target controlled vehicle being abnormal.

11. A non-transitory computer-readable storage medium storing a computer program which, when executed by a processor, implements:

in response to acquiring a current braking trigger event, determining whether a target controlled vehicle is currently located in a braking monitoring period, wherein in response to a first braking trigger event being monitored after the target controlled vehicle is started and a first braking control instruction being sent to the target controlled vehicle, a first braking monitoring period is entered; and in response to the target controlled vehicle being currently located in a braking monitoring period, sending a braking control instruction corresponding to a next braking monitoring period to the target controlled vehicle according to ranking of the braking monitoring period in which the target controlled vehicle is currently located, and entering the next braking monitoring period; wherein duration of the next braking monitoring period is greater than duration of the braking monitoring period in which the target controlled vehicle is currently located, and vehicle control duration of the braking control instruction corresponding to the next braking monitoring period is greater than vehicle control duration of a braking control instruction corresponding to the braking monitoring period in which the target controlled vehicle is currently located;

wherein the computer program, when executed by the processor, implements, in response to the ranking of the braking monitoring period in which the target controlled vehicle is currently located being greater than or equal to three, sending the braking control instruction corresponding to the next braking monitoring period to the target controlled vehicle according to the ranking of the braking monitoring period in which the target controlled vehicle is currently located, and entering the next braking monitoring period in the following way:
  determining remaining vehicle control duration corresponding to the braking monitoring period in which the target controlled vehicle is currently located according to acquired time of the current braking trigger event;
  determining, according to the remaining vehicle control duration, vehicle control duration corresponding to a next braking monitoring period of the braking monitoring period in which the target controlled vehicle is currently located; and
  sending a stopping braking and waiting control instruction to the target controlled vehicle, entering the next braking monitoring period, and monitoring a braking trigger event;
wherein the stopping braking and waiting control instruction corresponds to vehicle control duration determined according to the remaining vehicle control duration; and
wherein the computer program, when executed by the processor, implements determining, according to the remaining vehicle control duration, the vehicle control duration corresponding to the next braking monitoring period of the braking monitoring period in which the target controlled vehicle is currently located in the following way:
superimposing the remaining vehicle control duration and preset delay duration to obtain a superimposed result, and using the superimposed result as the vehicle control duration corresponding to the next braking monitoring period of the braking monitoring period in which the target controlled vehicle is currently located.

12. The non-transitory computer-readable storage medium of claim 11, wherein the computer program, when executed by the processor, in response to the target controlled vehicle being not currently located in a braking monitoring period, further implements:
  using the current braking trigger event as the first braking trigger event, sending the first braking control instruction to the target controlled vehicle, and entering the first braking monitoring period;
wherein the first braking control instruction is a cadence braking control instruction and corresponds to first vehicle control duration.

13. The non-transitory computer-readable storage medium of claim 11, wherein the computer program, when executed by the processor, implements, in response to the target controlled vehicle being currently located in the first braking monitoring period, sending the braking control instruction corresponding to the next braking monitoring period to the target controlled vehicle according to the ranking of the braking monitoring period in which the target controlled vehicle is currently located, and entering the next braking monitoring period in the following way:
  sending a second braking control instruction to the target controlled vehicle, entering a second braking monitoring period, and monitoring a braking trigger event in the second braking monitoring period;
wherein the second braking control instruction is a stopping braking control instruction and corresponds to second vehicle control duration for the target controlled vehicle to stop.

14. The non-transitory computer-readable storage medium of claim 13, wherein the computer program, when executed by the processor, implements, in response to the target controlled vehicle being currently in the second braking monitoring period, sending the braking control instruction corresponding to the next braking monitoring period to the target controlled vehicle according to the ranking of the braking monitoring period in which the target controlled vehicle is currently located, and entering the next braking monitoring period in the following way:
  sending a third braking control instruction to the target controlled vehicle, entering a third braking monitoring period, and monitoring a braking trigger event in the third braking monitoring period;
wherein the third braking control instruction is a stopping braking and waiting control instruction and corresponds to third vehicle control duration for the target controlled vehicle to stop and wait.

* * * * *